US006146472A

United States Patent [19]
Leap

[11] Patent Number: 6,146,472
[45] Date of Patent: Nov. 14, 2000

[54] METHOD OF MAKING CASE-CARBURIZED STEEL COMPONENTS WITH IMPROVED CORE TOUGHNESS

[75] Inventor: Michael J. Leap, Massillon, Ohio

[73] Assignee: The Timken Company, Canton, Ohio

[21] Appl. No.: 09/172,390

[22] Filed: Oct. 14, 1998

Related U.S. Application Data

[60] Provisional application No. 60/086,978, May 28, 1998.

[51] Int. Cl.[7] .............................. C23C 8/22; C21D 1/06
[52] U.S. Cl. ........................................ 148/233; 148/225
[58] Field of Search .................................. 148/225, 226, 148/233, 319

[56] References Cited

U.S. PATENT DOCUMENTS

| | | | |
|---|---|---|---|
| 4,184,898 | 1/1980 | Ouchi et al. | 148/12 F |
| 4,824,492 | 4/1989 | Wright | 148/12.4 |
| 4,842,816 | 6/1989 | Miyasaka et al. | 420/84 |
| 5,100,613 | 3/1992 | Bodnar et al. | 420/120 |
| 5,131,965 | 7/1992 | McVicker | 148/334 |
| 5,403,410 | 4/1995 | Shikanai et al. | 148/328 |
| 5,409,554 | 4/1995 | Leap | 148/653 |
| 5,424,028 | 6/1995 | Maloney et al. | 148/233 |
| 5,595,613 | 1/1997 | Hatano et al. | 148/319 |
| 5,595,614 | 1/1997 | McVicker | 148/334 |
| 5,746,842 | 5/1998 | Eguchi et al. | 148/319 |

FOREIGN PATENT DOCUMENTS 57-89456   11/1982   Japan .

OTHER PUBLICATIONS

Krauss, George; "Microstructure and Performance of Carburized Steel, Part I: Martensite", *Advanced Materials & Processes* May 1995, 4 pp.
Krauss, George; "Microstructure and Performance of Carburized Steel, Part II: Austenite", *Advanced Materials & Processes* Jul. 1995, 5 pp.
Krauss, George; "Microstructure and Performance of Carburized Steel, Part III: Austenite & Fatigue", *Advanced Materials & Processes* Sep. 1995, 5 pp.
Krauss, George; "Microstructure and Performance of Carburized Steel, Part IV: Oxidation & Inclusions", *Avanced Materials & Processes* Dec. 1995, 5 pp.
Leslie, W.C., et al., "Solution and Precipitation of Aluminum Nitride in Relation to the Structure of Low Carbon Steels", *Transactions of the ASM*, vol. 46, pp. 1470–1497.
Hillert, M. et al., "The Regular Solution Model for Stoichiometric Phases and Ionic Melts", *Acta Chemica Scandinavica* 24 (1970) No. 10, pp. 3618–3626.
Leap, Michael J., et al., "Development of a Process for Toughening Grain–Refined, High–Strength Steels", *ASTM Standard Technical Publication 1259*, Aug. 1997, pp. 160–194.
Leap, M.J. et al., "Recent Advances in the Technology of Toughening Grain–Refined, High–Strength Steels", *SAE*, Technical Paper No. 961749, Aug. 1996, 15 pp.
Pacheco, Jose l. et al., "Microstructure and High Bending Fatigue Strength in Carburized Steel", *J. Heat Treating*, vol. 7, No. 2, 1989, pp. 77–86.
Leap, M.J. et al., "Interrelationships Between Toughness and Grain–Refining Precipitates in Lightly–Tempered, High–Strength Steels", *38th Mechanical Working & Steel Processing Conference Proceedings*, Iron & Steel Society, Inc. (1996), 19 pp.
Leap, M.J. et al., "Application of the Advantec™ Process for Improving the Toughness of Grain–Refined, High–Strength Steels", *38th Mechanical Working & Steel Processing Conference Proceedings*, Iron & Steel Society, Inc. (1996), 26 pp.

*Primary Examiner*—Deborah Yee
*Attorney, Agent, or Firm*—Webb Ziesenheim Logsdon Orkin & Hanson, P.C.

[57] ABSTRACT

A steel composition and method of processing have been developed that provide good grain coarsening resistance and optimum toughness after austenitizing at high temperatures for extended periods of time. The composition comprises, in % by weight, about: 0.10–0.40% C, 0.018–0.064% Nb, 0.024–0.066% Al, and 80–220 ppm N, the balance being Fe and other alloying elements found in common carburizing grades of steel. The steel is particularly suited to improving the core toughness of case-carburized components that require through-section toughness and fatigue resistance.

15 Claims, 10 Drawing Sheets

METHOD OF MAKING CASE-CARBURIZED STEEL COMPONENTS WITH IMPROVED CORE TOUGHNESS

CROSS REFERENCE TO RELATED APPLICATION

This application claims the benefit of earlier filed Provisional Application Ser. No. 60/086,978, filed May 28, 1998, entitled "Steel with Improved Core Toughness in Case-Carburized Components."

BACKGROUND OF THE INVENTION

The present invention relates generally to the art of metallurgy and, more particularly, to steel compositions and methods of processing that provide good grain-coarsening resistance and optimum core toughness in case-carburized steel components for automotive and machine structural applications.

Case-carburized components are utilized in a variety of automotive and machine structural components that are typically subjected to high cyclic stresses in service. Carburizing provides a hard, wear-resistant surface layer with good fatigue resistance. The resistance to fatigue is derived from (i) the inherent strength of the case microstructure, (ii) the presence of compressive residual stresses in the carburized case, and (iii) the suppression of intergranular fatigue crack initiation through control over the extent of quench embrittlement and intergranular oxidation, see "Microstructure and Performance of Carburized Steel, Parts I–IV," G. Krauss, Advanced Materials & Processes, 1995. Many components are also subjected to moderately frequent overloads in service, and under these conditions the mechanical properties of the underlying core material may become a factor in the overall durability of a component. The importance of core microstructure is exacerbated by the current trend in the automotive industry to increase the power density of highly stressed components via reductions in weight. These increases in power density are sometimes achieved by redesigning to minimize the decrease in component stiffness that typically accompanies reductions in weight. However, the ability to maintain component stiffness tends to be limited by geometric constraints in many mechanical systems, and in these cases structural integrity may exhibit a substantial dependence on the through-section properties of a component. Thus, improvements in the durability of more compliant components subjected to high nominal stresses and overloads will necessarily require carburizing grades of steel with improved toughness. Since high-carbon martensite exhibits low absolute levels of toughness, improvements in the through-section toughness of case-carburized components will primarily depend on the ability to generate substantially improved core toughness after carburizing at elevated temperatures for extended periods of time.

Air-melt, aluminum-killed steels comprise a vast majority of the "fine-grained" carburizing grades of steel in use today. Recent work on air-melt steels has shown that toughness is primarily limited by the presence of coarse grain-refining precipitates in lightly-tempered martensitic microstructures, see for example, M. J. Leap, U.S. Pat. No. 5,409,554. However, the mechanism of toughening associated with the refinement of coarse grain-refining precipitates is limited to comparatively short austenitizing times (i.e., times representative of reheating for the hardening operation). Austenitization for extended periods of time promotes precipitate coarsening at constant volume fraction, such that the toughness of aluminum-killed steels with refined dispersions of AlN precipitates is significantly degraded after austenitization under conditions representative of carburizing. For the case of conventionally-processed steels containing coarse grain-refining precipitates, austenitization for extended periods of time will at most provide a very small increase in toughness. This small increment of toughening is derived from the dissolution of intermediate-sized precipitates in the dispersion during the coarsening process. Thus, the prior art does not address the effects of precipitate coarsening on the development of toughness in tempered martensitic microstructures, particularly when a fine-grained microstructure is desired after austenitization at elevated temperatures for extended periods of time.

SUMMARY OF THE INVENTION

The present invention is directed to a steel composition and method of processing which provides good toughness after appropriate processing and austenitization at elevated temperatures for extended periods of time (e.g., carburization). A specific object of the invention includes the specification of compositional limits for niobium, aluminum and nitrogen that are applicable to any low-alloy or alloy grade of steel containing 0.1–0.4% C, such that good toughness is obtained after appropriate processing and austenitization at elevated temperatures for extended periods of time. Additional advantages and attributes of the present invention relate to the combined development of optimum core toughness and good grain coarsening resistance when a steel, subsequent to preprocessing in a prescribed manner, is subjected to single-quench and double-quench carburizing processes.

A complete understanding of the invention will be obtained from the following description when taken in connection with the accompanying drawing figures wherein like reference characters identify like parts throughout.

DETAILED DESCRIPTION OF THE PREFERRED EMBODIMENTS

The present invention involves the addition of niobium to air-melt, aluminum-killed steels to provide microstructures that, after appropriate processing, are extremely resistant to the degradation in toughness resulting from the coarsening of grain-refining precipitates during austenitization at elevated temperatures for extended periods of time. The preferred embodiments of the present invention comprise a steel composition and method of processing that impart an extraordinary resistance to the effects of particle embrittlement while concurrently providing good austenite grain coarsening resistance in carburized components.

Figure 1:
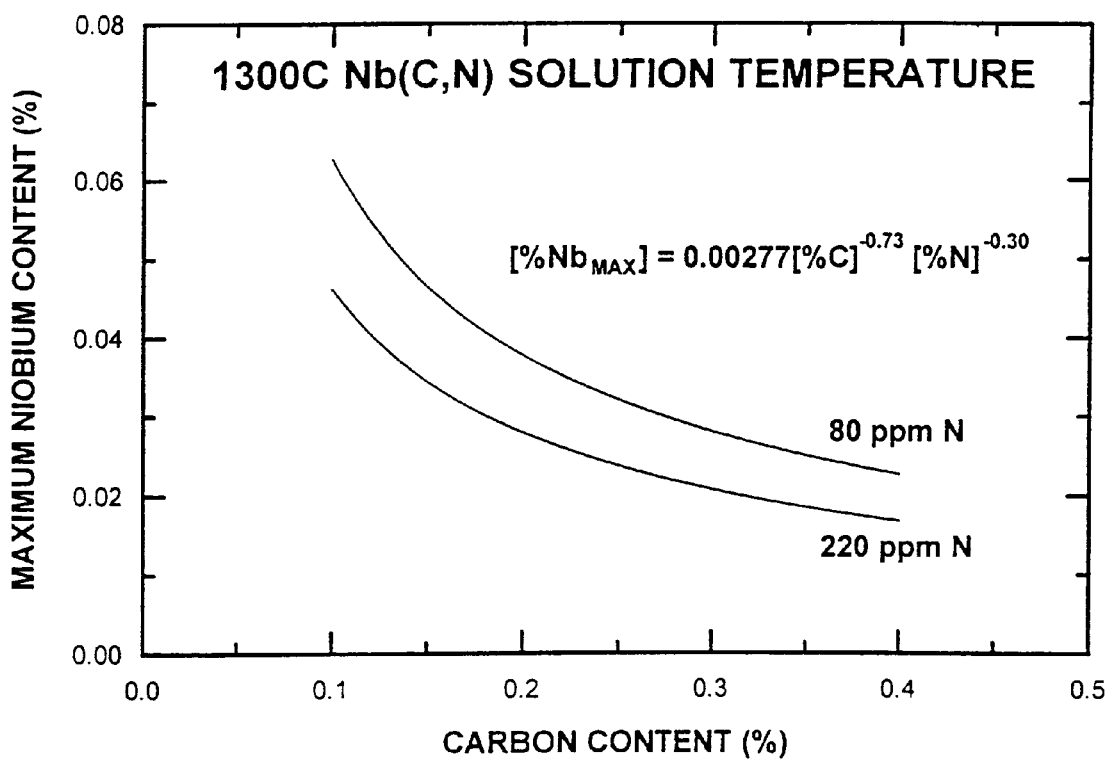
FIG. 1 is a graph showing the maximum niobium content as a function of carbon content and nitrogen content for steel compositions with a Nb(C,N) solution temperature of 1300° C.

The compositional limits for niobium and aluminum are premised on the fact that most carburizing grades of steel contain between 0.1% C and 0.4% C. Two additional constraints define appropriate compositional limits for niobium and aluminum in this range of carbon content. First, since improvements in toughness require the complete solution and reprecipitation of grain-refining precipitates prior to carburizing, 1300° C. is taken as an upper bound on a solution pretreatment temperature for steels containing 0.1–0.4% C. Second, the nitrogen content of the steel is restricted to between 80 ppm and 220 ppm. The former value represents a lower bound on the content of nitrogen typically associated with air-melt, electric arc furnace steels and the latter value represents an upper bound on nitrogen content predicated on material soundness considerations. Based on these compositional restrictions, the maximum niobium content is shown as a function of carbon and nitrogen contents in FIG. 1 for a Nb(C,N) solution temperature of 1300° C., see "The Regular Solution Model for Stoichiometric Phases and Ionic Melts," M. Hillert and L. I. Staffansson, Acta Chemica Scandinavica, Vol. 24, 1970, pp. 3618–3626. The results of these calculations indicate that the niobium content is restricted to between 0.018% and 0.064% as the carbon and nitrogen contents vary from 0.4% and 220 ppm to 0.1% and 80 ppm, respectively. Compositional limits for aluminum can be directly calculated from a conservative estimate of the solubility product for AlN in austenite, see "Solution and Precipitation of Aluminum Nitride in Relation to the Structure of Low Carbon Steels," W. C. Leslie, R. L. Rickett, C. L. Dotson, and C. S. Walton, Transactions of the American Society for Metals, Vol. 46, 1954, pp. 1470–1497. The 80–220 ppm range of nitrogen content translates into compositional limits of 0.066% and 0.024% for aluminum in the steel. The compositional limits for niobium and aluminum, when applied in conjunction with a 1300° C. pretreatment, can be estimated from the following constitutive expressions:

$$[\% \, Nb_{MAX}] = 2.77 \times 10^{-3} [\% \, C]^{-0.73} [\% \, N]^{-0.30} \quad [1]$$

and $$[\% \, Al_{MAX}] = 5.32 \times 10^{-4} [\% \, N]^{-1} \quad [2]$$

wherein the elemental concentrations represent the allowable weight percentage of each element in a steel.

Figure 2:
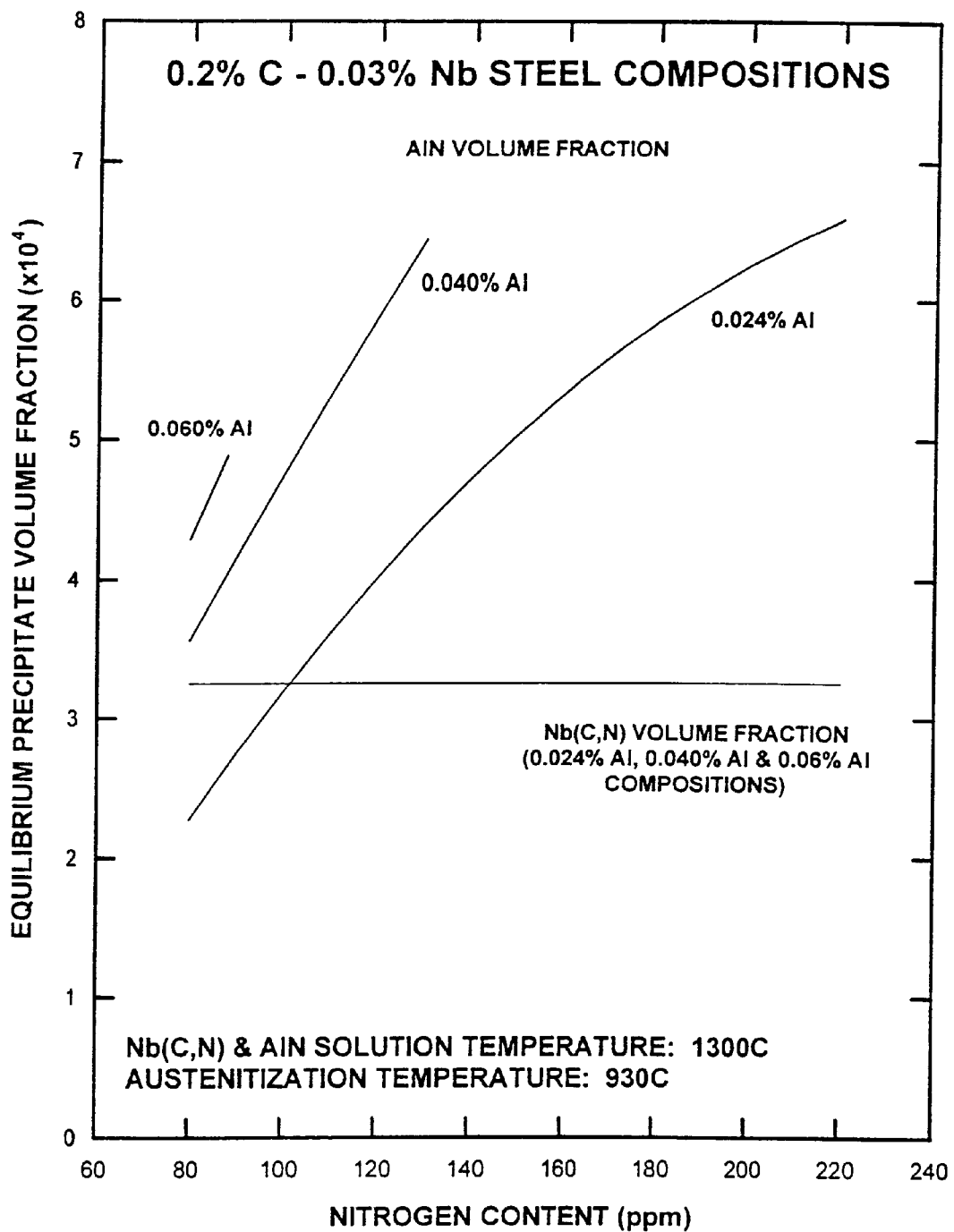
FIG. 2 is a graph showing calculated values of equilibrium precipitate volume fraction at 930° C. as a function of nitrogen and aluminum contents for 0.2% C–0.03% Nb steels with Nb(C,N) and AlN solution temperatures of 1300° C.

Notwithstanding the effects of intergranular oxidation, it is known that the retention of a fine-grained microstructure will provide increased bending fatigue resistance in case-carburized components. Defining a broad range of nitrogen content in the present invention provides a means of controlling the resistance to austenite grain growth, such that good fatigue resistance is obtained after carburizing at elevated temperatures for extended periods of time. Steels containing appropriate combinations of niobium, aluminum and nitrogen are somewhat unique in this regard since both Nb(C,N) and AlN are thermodynamically stable and form somewhat independently of each other over a broad range of temperature. This property allows grain growth resistance to be varied exclusively through changes in the aluminum and nitrogen contents for a given niobium content, see FIG. 2. Thus, a steel with a low nitrogen content can be utilized in single-quenched components subjected to relatively mild carburizing schedules (i.e., relatively short times at lower temperatures) or double-quenched specimens subjected to more severe carburizing cycles. A high-nitrogen steel, on the other hand, will possess good grain coarsening resistance in both single-quenched and double-quenched components subjected to even more severe carburizing cycles. The steel of the present invention, when processed in an appropriate manner, provides a substantial improvement over steels of the prior art in that optimum through-section toughness and high levels of grain coarsening resistance can be obtained with relatively severe carburizing operations.

Appropriate processing prior to carburizing, according to the present invention, comprises the first two operations defined in U.S. Pat. No. 5,409,554 of Leap. Initially, the steel is reheated at a temperature above the solution temperature of the least soluble species of grain-refining precipitate in the steel. The fundamental purpose of the solution pretreatment is to dissolve the grain-refining precipitates in the material, particularly the extremely coarse precipitates that are difficult to resolve. Subsequent to reheating, the steel is hot worked at as high a temperature as possible and then cooled in an accelerated manner to below 500° C. in order to limit the reprecipitation of grain-refining elements in austenite. The steps that comprise the solution pretreatment can be integrated into the finish working or forging operations for a steel. The solution pretreatment is followed by a subcritical anneal in the range of temperature from 650° C. to the lower critical transformation temperature for the steel (i.e., the $A_{C1}$ temperature). The purpose of this operation is to reprecipitate the maximum content of grain-refining elements in the form of a dense dispersion of fine particles. After the application of a solution pretreatment and subcritical anneal, steels with niobium, aluminum and nitrogen contents within the specified ranges of the present invention can be austenitized at elevated temperatures for extended periods of time without experiencing either the degradation in toughness or the low absolute levels of toughness exhibited by steels of the prior art.

Carburizing in the present context can be conducted in two basic manners, consistent with known methods of the prior art. The single-quench process comprises reheating and soaking components at a carburizing temperature in an appropriate atmosphere to introduce carbon into the near-surface regions of the part (i.e., the boost cycle). After the boost cycle, the components are soaked, sometimes at a somewhat lower temperature, in an atmosphere with a lower concentration of carbon for a time sufficient to fully develop the desired carbon profile in the case (i.e., the diffuse cycle). The components are then quenched to harden the steel, although in many cases parts are cooled and equilibrated at a lower temperature prior to quenching. The double-quench process comprises the steps outlined for the single-quench process plus reaustenitization at low temperatures in either the austenite phase field or the austenite plus cementite phase field. The latter heat treatment, which is referred to as intercritical austenitization, is very versatile in that austenitization can be conducted at temperatures between the lower critical temperature ($A_{C1}$ temperature) and the upper critical transformation temperature (i.e., the $A_{CM}$ temperature) for any position (i.e., carbon content) in the case, thereby allowing some control over the extent of carbide precipitation in the case microstructure. Reaustenitization at lower temperatures is conducted for two primary reasons. First, since reaustenitization allows the soluble carbon content of the case to be controlled via the precipitation of carbides, some degree of control can be maintained over the retained austenite content of the resultant microstructure. Second, reaustenitization provides austenite grain refinement which, as previously indicated, improves fatigue performance. Although the prior art suggests, in a very general sense, that austenite grain refinement is beneficial to component toughness, the following examples demonstrate that the effect of grain refinement on the toughness of lightly-tempered martensite (i.e., core toughness) is small in comparison to that of grain-refining precipitates after austenitization at elevated temperatures for extended periods of time.

EXAMPLES

Embodiments of the present invention are illustrated through examples for a conventional 8620 steel, a high-nitrogen 8720 steel, and two niobium-modified 5120 steels. The compositions of the production steels are listed in Table 1. The 8620 steel of the prior art contains aluminum and nitrogen in concentrations representative of EAF steelmaking practices while the 8720 steel contains 0.036% Al and an elevated nitrogen content. The two 5120 steels representing embodiments of the present invention contain 0.03% Nb, 0.027–0.034% Al, and nitrogen contents of 127 ppm and 200 ppm.

The 8620 and high-nitrogen 8720 steels (comparison steels) were obtained in the form of wrought billets. Sections of the billets were reheated at 1230–1260° C. for 3–4 hours, forged to a 140 mm width and 70 mm thickness, and air cooled to room temperature. Each section was milled to a 64 mm thickness, reheated at either 1250° C. (8620 steel) or 1300° C. (8720 steel) for three hours, hot rolled to 16 mm plate in five passes, and air cooled to room temperature. Billet sections were also quenched immediately after hot rolling, subcritically annealed at 700° C. for 1.5 hours, and air cooled to room temperature. The air-cooled plates are hereafter referred to as the conventionally-processed steels while the direct-quenched and subcritically annealed plates are referred to as the pretreated/annealed steels.

TABLE 1

Steel Compositions (weight percentages)

| Steel | C | Mn | Si | Cr | Ni | Mo | S | P | Nb | Al | N (ppm) |
|---|---|---|---|---|---|---|---|---|---|---|---|
| 8620 (comparison) | 0.20 | 0.80 | 0.26 | 0.47 | 0.48 | 0.18 | 0.036 | 0.008 | — | 0.028 | 88 |
| 8720 (comparison) | 0.22 | 0.91 | 0.28 | 0.61 | 0.41 | 0.28 | 0.019 | 0.006 | — | 0.036 | 206 |
| 5120-1 (invention) | 0.22 | 0.85 | 0.23 | 1.17 | 0.11 | 0.14 | 0.020 | 0.017 | 0.030 | 0.027 | 127 |
| 5120-2 (invention) | 0.20 | 0.80 | 0.21 | 1.21 | 0.11 | 0.14 | 0.017 | 0.008 | 0.032 | 0.034 | 200 |

The niobium-modified 5120 steels (steels of the present invention) were obtained in the form of 54 mm diameter wrought bars. Sections of the bars were reheated at 1300° C. for two hours, oil quenched to room temperature, subcritically annealed at 700° C. for 1.5 hours, and air cooled to room temperature. The as-rolled bars represent the material in the conventionally-processed condition and the reheated, quenched and subcritically annealed bars represent the pretreated/annealed condition as applied to the steels of the present invention. The latter combination of steel composition and method of processing represents embodiments of the present invention.

Oversized test specimen blanks were extracted from the mid-plane of the hot-rolled plates and the mid-radius of the bars in the LT and LR orientations, respectively. The blanks were heat treated in a fluidized bed furnace with a controlled atmosphere at temperatures between 900° C. and 1000° C. for times ranging from one hour to 24 hours. All specimens were subsequently water quenched to form fully hardened martensitic microstructures. Specimens for the single-quenched condition were then tempered at 180° C. for one hour while specimens for the double-quenched condition were reaustenitized at 900° C. for one hour, water quenched, and tempered at 180° C. for one hour.

Impact testing of standard Charpy V-notch specimens was conducted at 24° C. and 120° C. in accordance with ASTM E23. The 120° C. test temperature simulates the elevated temperatures typically experienced by case-carburized steels as used in automotive components. The data points graphically set forth in FIGS. 3–10 include error bars which represent estimates of the standard deviation in the mean values of impact toughness.

Example 1

8620 Steel

Figure 3:
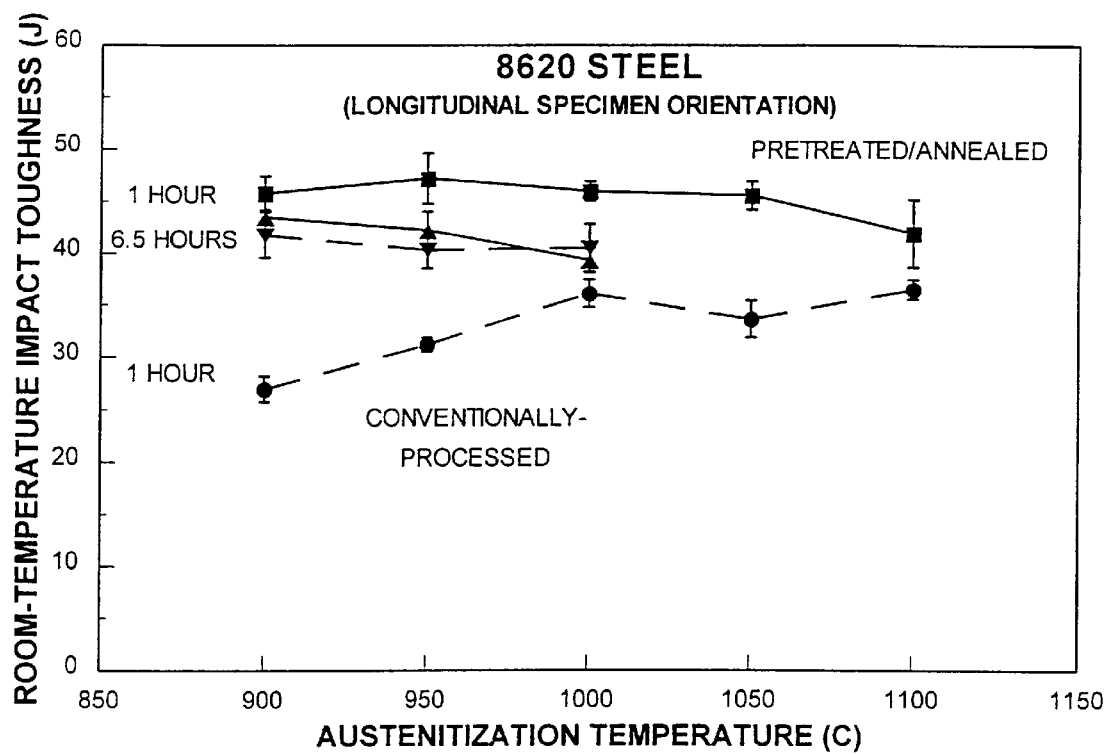
FIG. 3 is a graph showing room-temperature impact toughness as a function of austenitizing temperature and time for conventionally-processed and pretreated/annealed specimens of a conventional 8620 steel. Data are shown for a one-hour austenitization treatment and a double-quench process in which specimens were austenitized at temperatures in the 900–1000° C. range for 6.5 hours, water quenched, reaustenitized at 900° C. for one hour, and water quenched, wherein all specimens were tempered at 180° C. for one hour.

The variation in room-temperature impact toughness with austenitization temperature and time is shown in FIG. 3 for conventionally-processed and pretreated/annealed specimens of the 8620 steel of composition set forth in Table 1. Consistent with the teachings of U.S. Pat. No. 5,409,554 of Leap, the impact toughness of the pretreated/annealed specimens is significantly greater than the toughness of the conventionally-processed steel after austenitization for one hour in the 900–1100° C. range. Double-quenched specimens of the conventionally-processed and pretreated/annealed steels exhibit near-optimum impact toughness after austenitization at 900° C. for 6.5 hours, although the toughness of the two material conditions decreases with increases in austenitization temperature. The degradation in toughness that accompanies the increases in austenitization temperature for the one-hour treatments results from the preferential dissolution of a significant amount of fine AlN precipitates prior to the coarsening of the residual dispersion, and this effect is exacerbated by the relatively low content of nitrogen in the steel. However, the similar levels of toughness exhibited by the two material conditions after austenitization for 6.5 hours result from the coarsening of a comparatively low density of coarse AlN precipitates in the conventionally-processed steel and a higher density of intermediate-sized precipitates in the pretreated/annealed steel. Although the competing effects of precipitate size and density affect the toughness of this steel to a similar degree, the good toughness exhibited by the conventionally-processed steel after austenitization at 900° C. for 6.5 hours is of little commercial interest. Moreover, the relatively low content of AlN in combination with a high precipitate coarsening potential ([Al]/[N]=3.18) will only provide limited resistance to grain coarsening during carburization, such that single-quenched components could potentially exhibit low high-cycle fatigue resistance, increased distortion, lower case depth uniformity, and the development of unfavorable (non-uniform) residual stress profiles in the case.

Example 2

High-Nitrogen 8720 Steel

Figure 4:
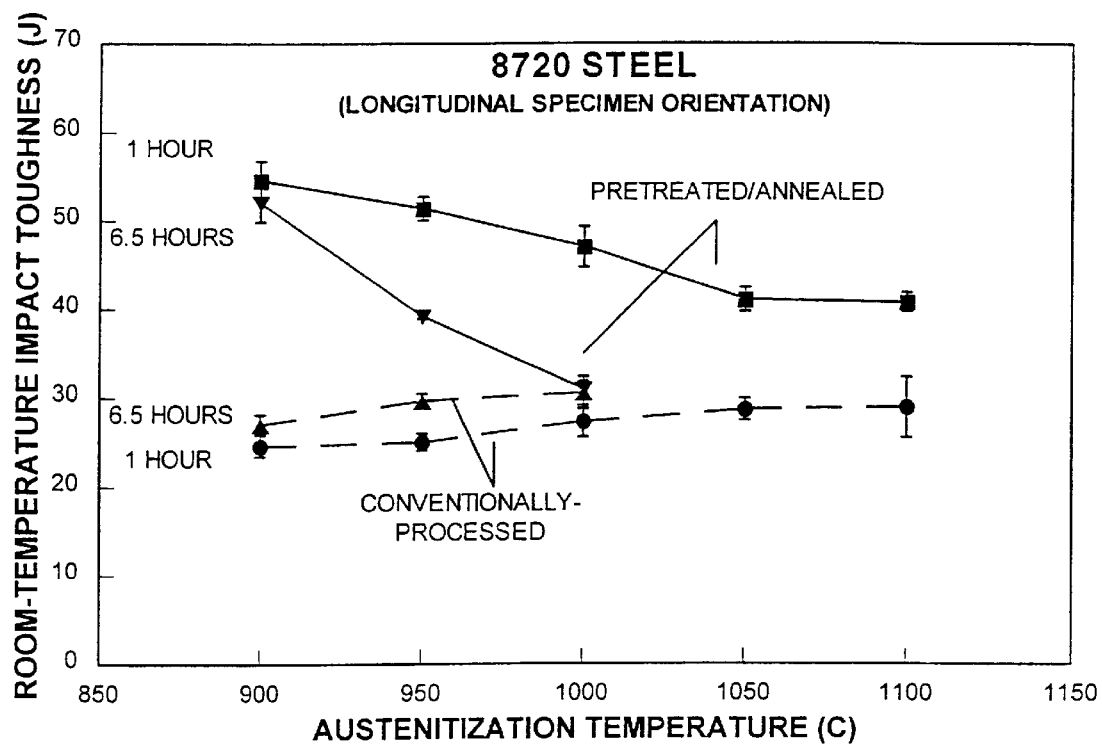
FIG. 4 is a graph showing room-temperature impact toughness as a function of austenitizing temperature and time for conventionally-processed and pretreated/annealed specimens of a high-nitrogen 8720 steel. Data are shown for a one-hour austenitization treatment and a double-quench process in which specimens were austenitized at temperatures in the 900–1000° C. range for 6.5 hours, water quenched, reaustenitized at 900° C. for one hour, and water quenched, wherein all specimens were tempered at 180° C. for one hour.

The room-temperature impact toughness levels of conventionally-processed and pretreated/annealed specimens of the 8720 steel are shown as a function of austenitizing temperature and time in FIG. 4. The conventionally-processed steel exhibits a comparatively low level of toughness after austenitization at 900° C. for one hour, and the steel only exhibits minor increases in impact toughness with austenitization temperature over the 900–1100° C. range. Conversely, the pretreated/annealed steel exhibits optimum impact toughness after austenitization at 900° C. for one hour, and the toughness of this material decreases towards the values exhibited by the conventionally-processed specimens as the austenitizing temperature approaches the AlN solution temperature. The impact toughness of the conventionally-processed, double-quenched specimens parallels the data for specimens subjected to a one-hour austenitizing treatment, which suggests that the minor increase in toughness over the 900–1000° C. range reflects the effects of precipitate coarsening in a predominantly coarse dispersion. The pretreated/annealed specimens, on the other hand, exhibit optimum impact toughness after austenitization at 900° C. for 6.5 hours, and the toughness of the double-quenched specimens decreases and converges with that of the conventionally-processed specimens after 6.5 hours at 1000° C. This decay in the toughness of the pretreated/annealed specimens represents the effects of coarsening at decreasing equilibrium precipitate content in an initially refined dispersion of AlN.

In contrast to the 8620 steel, the data for the double-quenched 8720 specimens illustrate the degradation in toughness associated with the presence of a much higher content of AlN and a lower precipitate coarsening potential (i.e., [Al]/[N]=1.75). Nevertheless, the complete degradation in toughness after 6.5 hours at 1000° C. again suggests that the precipitate refinement process will be of limited commercial utility when applied to high-nitrogen, aluminum-killed steels.

Example 3

Low-Nitrogen, Niobium-Modified 5120 Steel

Figure 5:
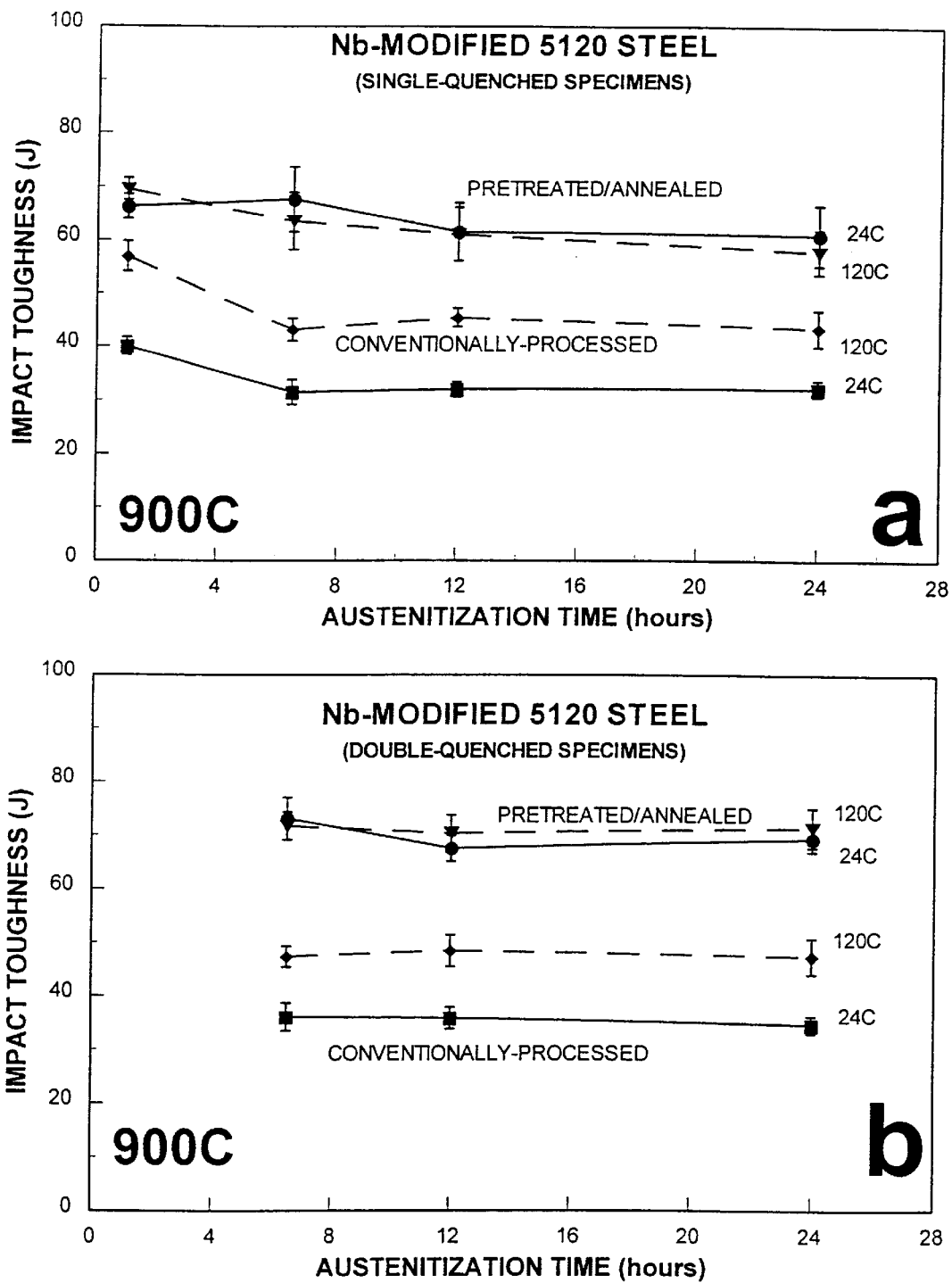
FIGS. 5a and 5b are graphs showing impact toughness at 24° C. and 120° C. as a function of austenitizing time at 900° C. for conventionally-processed and pretreated/annealed specimens of a niobium-modified 5120 steel containing 127 ppm N, wherein FIG. 5a covers single-quenched specimens and FIG. 5b covers double-quenched specimens.
Figure 6:
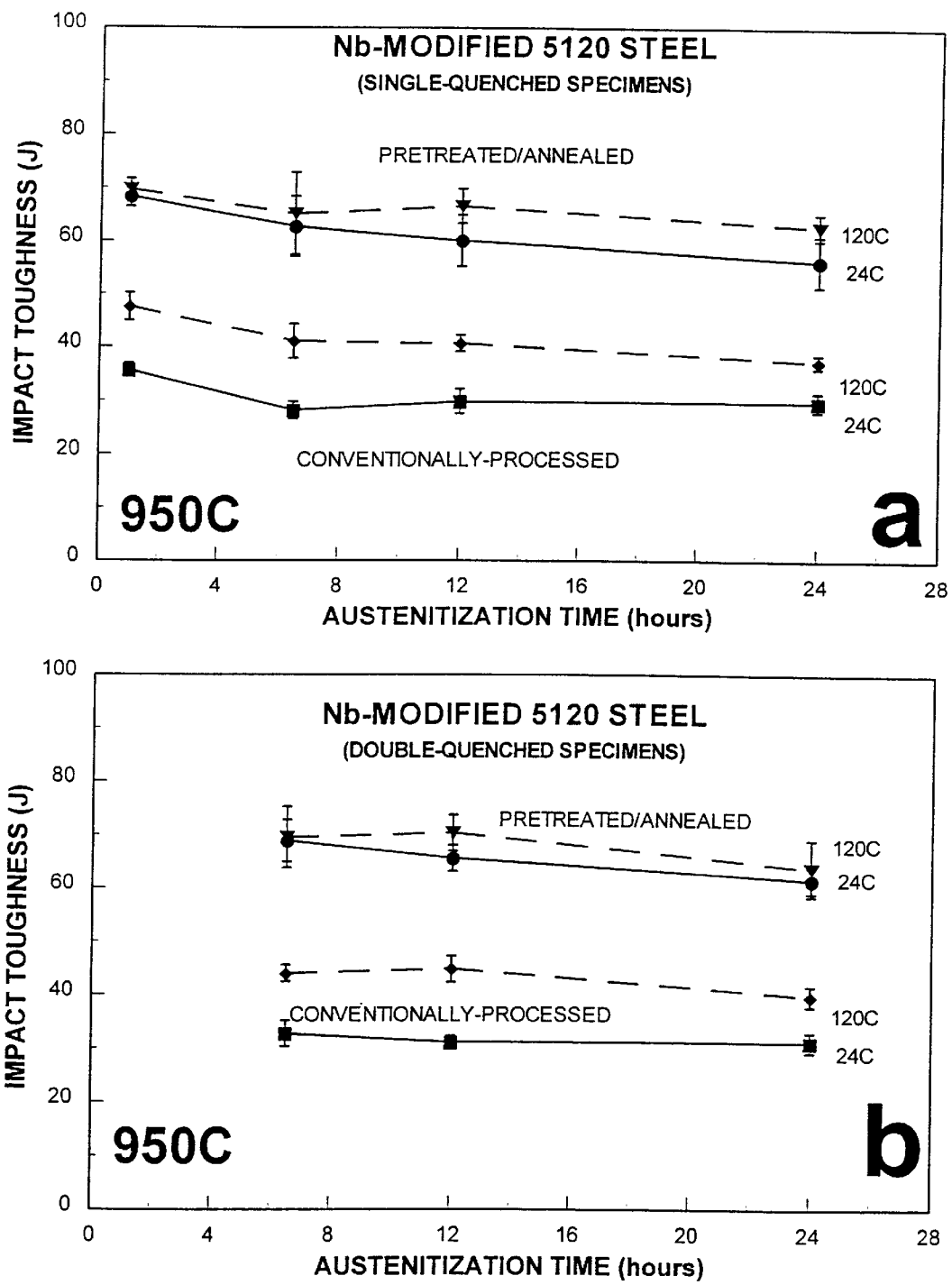
FIGS. 6a and 6b are graphs showing impact toughness at 24° C. and 120° C. as a function of austenitizing time at 950° C. for conventionally-processed and pretreated/annealed specimens of a niobium-modified 5120 steel containing 127 ppm N, wherein FIG. 6a covers single-quenched specimens and FIG. 6b covers double-quenched specimens.
Figure 7:
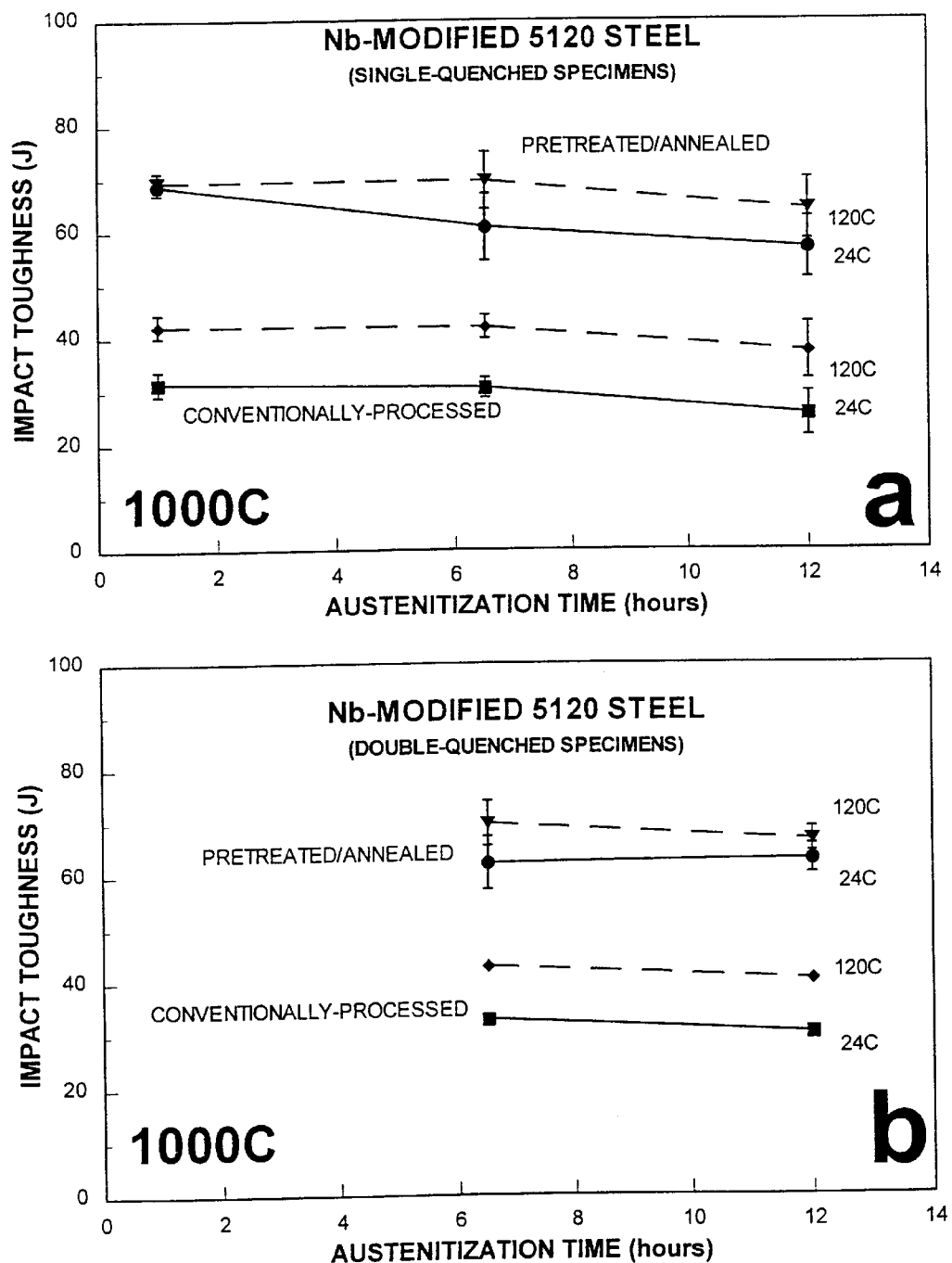
FIGS. 7a and 7b are graphs showing impact toughness at 24° C. and 120° C. as a function of austenitizing time at 1000° C. for conventionally-processed and pretreated/annealed specimens of a niobium-modified 5120 steel containing 127 ppm N, wherein FIG. 7a covers single-quenched specimens and FIG. 7b covers double-quenched specimens.

The effects of austenitizing temperature and time on the development of toughness in the low-nitrogen, niobium-modified 5120 steel (identified as Steel 5120-1 in Table 1) are shown in FIGS. 5–7. In comparison to the conventionally-processed steel, both single-quenched and double-quenched specimens of the pretreated/annealed steel exhibit clearly superior impact toughness at 24° C. and 120° C. after austenitization at 950° C. and 1000° C. for times up to 24 hours and 12 hours, respectively.

The incremental increases in toughness associated with an increase in test temperature suggest that transitional fracture behavior is exhibited by some of the specimen sets at 24° C., thereby possibly overestimating the processing-induced improvements in room-temperature toughness. In other words, the processing-induced improvements in toughness may be convoluted with a shift in the impact transition-temperature curves for some of the specimen sets. It is important to recognize, however, that the shift in the impact transition-temperature curves fundamentally results from the refinement of grain-refining precipitates through both grain size control and a direct effect of the precipitates on fracture surface formation. In contrast, all specimens tested at 120° C. exhibit upper-shelf fracture behavior, and the comparison of toughness for the two material conditions reflects a constant mode of unstable fracture in the Charpy V-notch specimens.

Example 4

High-Nitrogen, Niobium-Modified 5120 Steel

Figure 8:
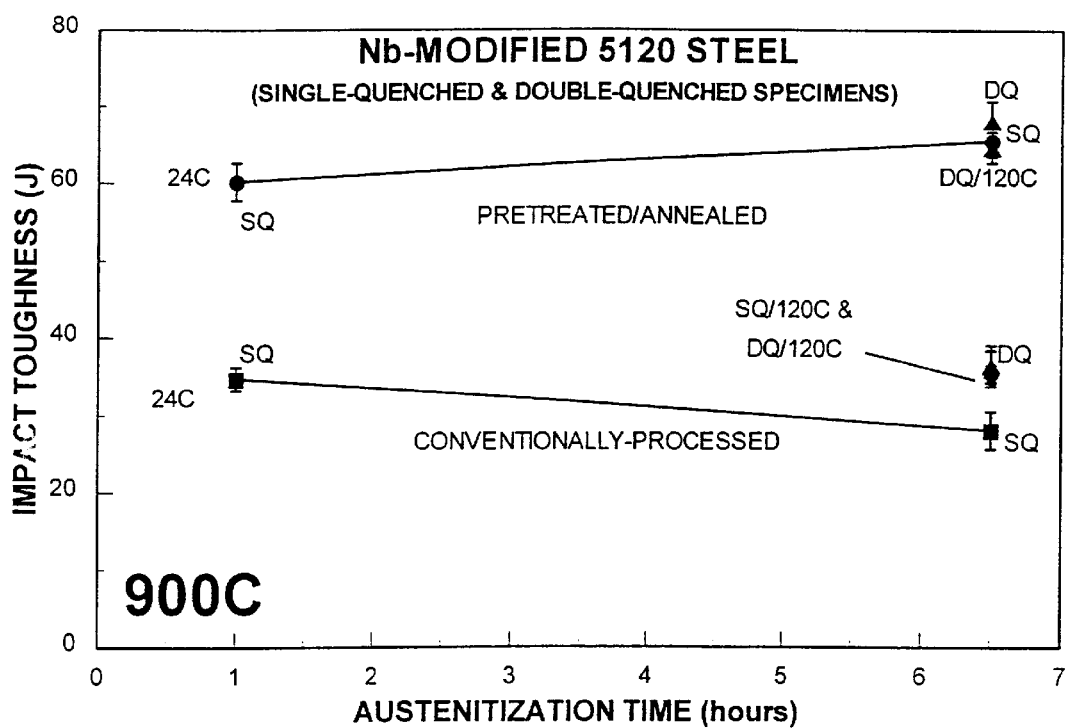
FIG. 8 is a graph showing impact toughness at 24° C. and 120° C. as a function of austenitizing time at 900° C. for conventionally-processed and pretreated/annealed specimens of a niobium-modified 5120 steel containing 200 ppm N, wherein single-quenched specimens are designated "SQ" and double-quenched specimens are designated "DQ"
Figure 9:
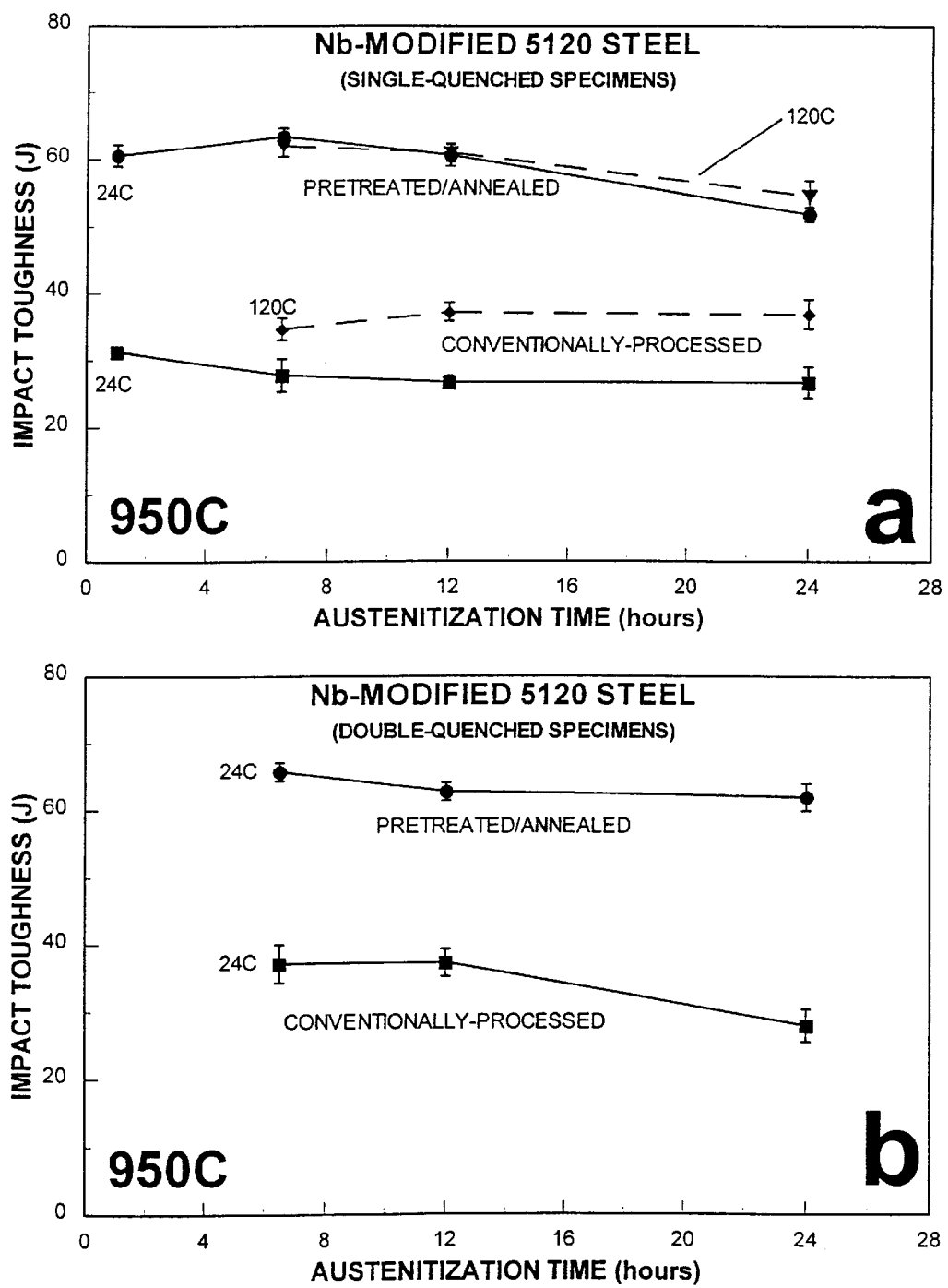
FIGS. 9a and 9b are graphs showing impact toughness at 24° C. and 120° C. as a function of austenitizing time at 950° C. for conventionally-processed and pretreated/annealed specimens of a niobium-modified 5120 steel containing 200 ppm N, wherein FIG. 9a covers single-quenched specimens and FIG. 9b covers double-quenched specimens.
Figure 10:
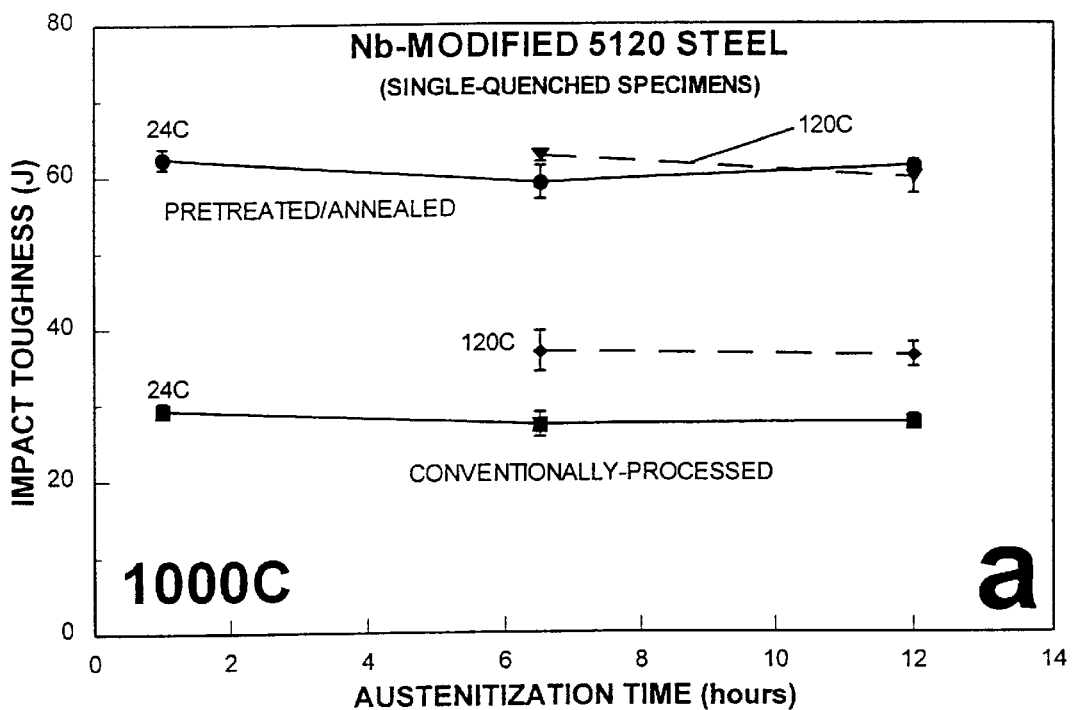
FIGS. 10a and 10b are graphs showing impact toughness at 24° C. and 120° C. as a function of austenitizing time at 1000° C. for conventionally-processed and pretreated/annealed specimens of a niobium-modified 5120 steel containing 200 ppm N, wherein FIG. 10a covers single-quenched specimens and FIG. 10b covers double-quenched specimens.
Figure 10:
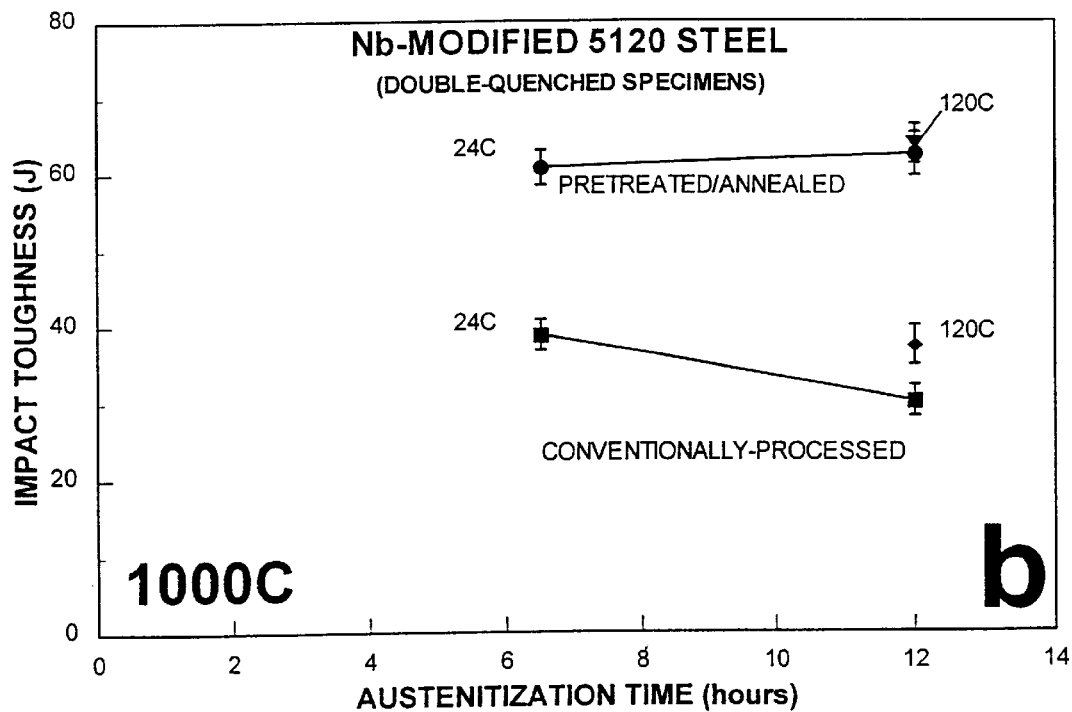

The effects of austenitizing temperature and time on the development of toughness in the high-nitrogen, niobium-modified 5120 steel (identified as Steel 5120-2 in Table 1)

are shown in FIGS. 8–10. Once again, both single-quenched and double-quenched specimens of the pretreated/annealed steel exhibit significantly greater levels of impact toughness than the corresponding conventionally-processed specimens after austenitization in the 900–1000° C. range for times ranging from 6.5 hours to 24 hours.

The steel composition of the present invention, when processed in accordance with the disclosed method, provides optimum levels of toughness via two mechanisms. First, the refinement of grain-refining precipitates minimizes the direct effect of these second-phase particles on the toughness of lightly-tempered martensite over a broad range of test temperature. Second, the ability to control the austenite grain structure through composition and processing will provide an increment of toughness in the transition-temperature and lower-shelf fracture regimes. The retention of a fine-grained austenite microstructure will also promote the development of good fatigue resistance in the case of carburized components.

The ability to maintain good toughness after extended times at elevated temperatures (i.e., 12 hours at 1000° C.) suggests that the steel composition of the present invention is applicable to gas, vacuum and plasma carburizing. In fact, the high-nitrogen steel of the present invention, when processed in an appropriate manner, will help to alleviate many of the problems associated with particle embrittlement and grain size control in both single-quenched and double-quenched components that are carburized at temperatures approaching 1000° C.

It should be understood that the present invention is not limited to the specific embodiments herein described, and the steel composition of the present invention, when processed in accordance with the disclosed method, can be utilized in other ways without departing from the spirit of the invention and fundamental understanding that underlies the development of optimum toughness and good fatigue resistance in case-carburized components.

I claim:

1. A method of making a carburizing steel exhibiting optimum core toughness properties and good austenite grain coarsening resistance which is suitable for the manufacture of automotive and machine structural components, comprising the steps of:
   a. providing a steel comprising in % by weight: 0.10–0.40 C, 0.018–0.064 Nb, 0.024–0.066 Al, and 80–220 ppm N, the balance being substantially iron and other alloying elements found in common carburizing grades of steel;
   b. conducting a solution pretreatment that comprises reheating the steel at a temperature near or above a solution temperature of the least soluble species of grain-refining precipitate in the steel, hot rolling at high temperatures, and accelerated cooling to 500° C.;
   c. subcritical annealing at temperatures in the range from 650° C. to the $A_{C1}$;
   d. carburizing at elevated temperatures for an extended period of time, quenching; and
   e. tempering at temperatures below about 250° C.

2. The method of claim 1 wherein accelerated cooling after hot rolling is one or more selected from the group consisting of water quenching, oil quenching, water-mist cooling, and forced-air cooling to 500° C.

3. The method of claim 1 in which a multiple-zone furnace is utilized for the subcritical annealing and carburizing steps, wherein subcritical annealing is conducted as one of a full isothermal anneal prior to carburizing or as a short-time isothermal anneal followed by slow heating to a carburizing temperature.

4. The method of claim 1 wherein the carburizing step includes cooling from a carburizing temperature to a temperature above the $A_{r1}$, after a boost/diffuse cycle, followed by equilibrating at the lower temperature, and quenching.

5. The method of claim 1 wherein the carburizing step is one selected from the group consisting of gas, vacuum, and plasma carburizing.

6. A method of making a carburizing steel exhibiting optimum core toughness properties and good austenite grain coarsening resistance which is suitable for the manufacture of automotive and machine structural components, comprising the steps of:
   a. providing a steel comprising in % by weight: 0.10–0.40 C, 0.018–0.064 Nb, 0.024–0.066 Al, and 80–220 ppm N, the balance being substantially iron and other alloying elements found in common carburizing grades of steel;
   b. conducting a solution pretreatment that comprises reheating the steel at a temperature near or above a solution temperature of the least soluble species of grain-refining precipitate in the steel, hot rolling at high temperatures, and accelerated cooling to 500° C.;
   c. subcritical annealing at temperatures in the range from 650° C. to the $A_{C1}$;
   d. carburizing at elevated temperatures for an extended period of time, and conducting one of cooling or quenching;
   e. reaustenitizing at a temperature above the $A_{CM}$ temperature for the carburized case, quenching; and
   f. tempering at temperatures below about 250° C.

7. The method of claim 6 wherein accelerated cooling after hot rolling is one or more selected from the group consisting of water quenching, oil quenching, water-mist cooling, and forced-air cooling to 500° C.

8. The method of claim 6 in which a multiple-zone furnace is utilized for conducting the subcritical anneal and carburizing steps, wherein subcritical annealing is conducted as one of a full isothermal anneal prior to carburizing or as a short-time isothermal anneal followed by slow heating to a carburizing temperature.

9. The method of claim 6 wherein the carburizing step includes cooling from a carburizing temperature to a temperature above the $A_{r1}$ after a boost/diffuse cycle, followed by equilibrating at the lower temperature, and quenching.

10. The method of claim 6 wherein the carburizing operation is one selected from the group consisting of gas, vacuum, and plasma carburizing.

11. A method of making a carburizing steel exhibiting optimum core toughness properties and good austenite grain coarsening resistance which is suitable for the manufacture of automotive and machine structural components, comprising the steps of:
   a. providing a steel comprising in % by weight: 0.10–0.40 C, 0.018–0.064 Nb, 0.024–0.066 Al, and 80–220 ppm N, the balance being substantially iron and other alloying elements found in common carburizing grades;
   b. conducting a solution pretreatment that comprises reheating at a temperature near or above a solution temperature of the least soluble species of grain-refining precipitate in the steel, hot rolling at high temperatures, and accelerated cooling to 500° C.;
   c. subcritical annealing at temperatures in the range from 650° C. to the $A_{C1}$;
   d. carburizing at elevated temperatures for an extended period of time, and conducting one of cooling or quenching;

e. reaustenitizing at a temperature between the $A_{C1}$ and $A_{CM}$ temperatures for the carburized case, quenching; and f. tempering at temperatures below about 250° C.

12. The method of claim 11 wherein accelerated cooling after hot rolling is one or more selected from the group consisting of water quenching, oil quenching, water-mist cooling, and forced-air cooling to 500° C.

13. The method of claim 11 in which a multiple-zone furnace is utilized for the subcritical annealing and carburizing steps, wherein subcritical annealing is conducted as one of a full isothermal anneal prior to carburizing or as a short-time isothermal anneal followed by slow heating to a carburizing temperature.

14. The method of claim 11 wherein the carburizing step includes cooling from a carburizing temperature to a temperature above the $A_{r1}$ after a boost/diffuse cycle, followed by equilibrating at the lower temperature, and quenching.

15. The method of claim 11 wherein the carburizing operation is one selected from the group consisting of gas, vacuum, and plasma carburizing.

* * * * *